United States Patent [19]
Tsuchida

[11] Patent Number: 5,842,598
[45] Date of Patent: Dec. 1, 1998

[54] COMBINATION STORAGE SYSTEM AND COMPACT EJECTION MECHANISMS

[75] Inventor: Tamotsu Tsuchida, Iwatsuki, Japan

[73] Assignee: Asahi Seiko Co., Ltd., Tokyo, Japan

[21] Appl. No.: 709,227

[22] Filed: Sep. 3, 1996

[30] Foreign Application Priority Data

Sep. 4, 1995 [JP] Japan .................................. 7-263425

[51] Int. Cl.⁶ .............................. B65G 59/06; B65H 3/00; G07F 11/22
[52] U.S. Cl. ...................... 221/258; 221/275; 74/89.18; 74/109
[58] Field of Search .................................. 221/258, 260, 221/268, 270, 272, 259, 275; 74/89.17, 89.18, 422, 424.6, 109, DIG. 10

[56] References Cited

U.S. PATENT DOCUMENTS

| | | | |
|---|---|---|---|
| 3,845,669 | 11/1974 | Pickles | 74/422 |
| 4,168,595 | 9/1979 | Pickles et al. | 74/422 |
| 4,179,026 | 12/1979 | De Vries | 198/834 |
| 4,541,547 | 9/1985 | Miknyocki et al. | 221/260 |
| 4,592,245 | 6/1986 | Pickles | 74/89.21 |
| 5,150,631 | 9/1992 | Faerber et al. | 74/422 |
| 5,251,892 | 10/1993 | No et al. | 271/184 |
| 5,335,822 | 8/1994 | Kasper | 221/258 |
| 5,582,067 | 12/1996 | Snider | 74/DIG. 10 |
| 5,611,456 | 3/1997 | Kasper | 221/258 |
| 5,647,244 | 7/1997 | Girotto et al. | 74/89.17 |
| 5,668,790 | 9/1997 | Koizumi et al. | 369/194 |

FOREIGN PATENT DOCUMENTS

6114054 of 0000 Japan .

*Primary Examiner*—Karen M. Young
*Assistant Examiner*—Thuy V. Tran
*Attorney, Agent, or Firm*—Price, Gess & Ubell

[57] ABSTRACT

An ejection apparatus for dispensing an item from a stack of items, for example, in a vending machine, includes an ejector member mounted for reciprocal movement. A movable member is connected to the ejector member and can be relatively rigid when transmitting force to the ejector member during an ejection stroke but can be bent during a return stroke to enable a compact storage configuration. A tube member can receive the movable member and bend it during its return stroke.

11 Claims, 6 Drawing Sheets

COMBINATION STORAGE SYSTEM AND COMPACT EJECTION MECHANISMS

BACKGROUND OF THE INVENTION

1. Field of the Invention

The present invention is directed to an ejection apparatus for dispensing stored objects that can be suitably installed within an automatic vending machine.

2. Description of Related Art

Automatic vending machines can dispense different types of products, one at a time from a stack of such objects. The stored products can take various shapes and forms and can include floppy disks, compact disks, various types of cards, including magnetic prepaid cards and telephone cards, for example, and also plate-shaped boxes in which products are placed, such as tobacco and chocolate items. Such objects are frequently individually packaged in boxes that have a plate-like form, or tabular configuration.

Figure 5:
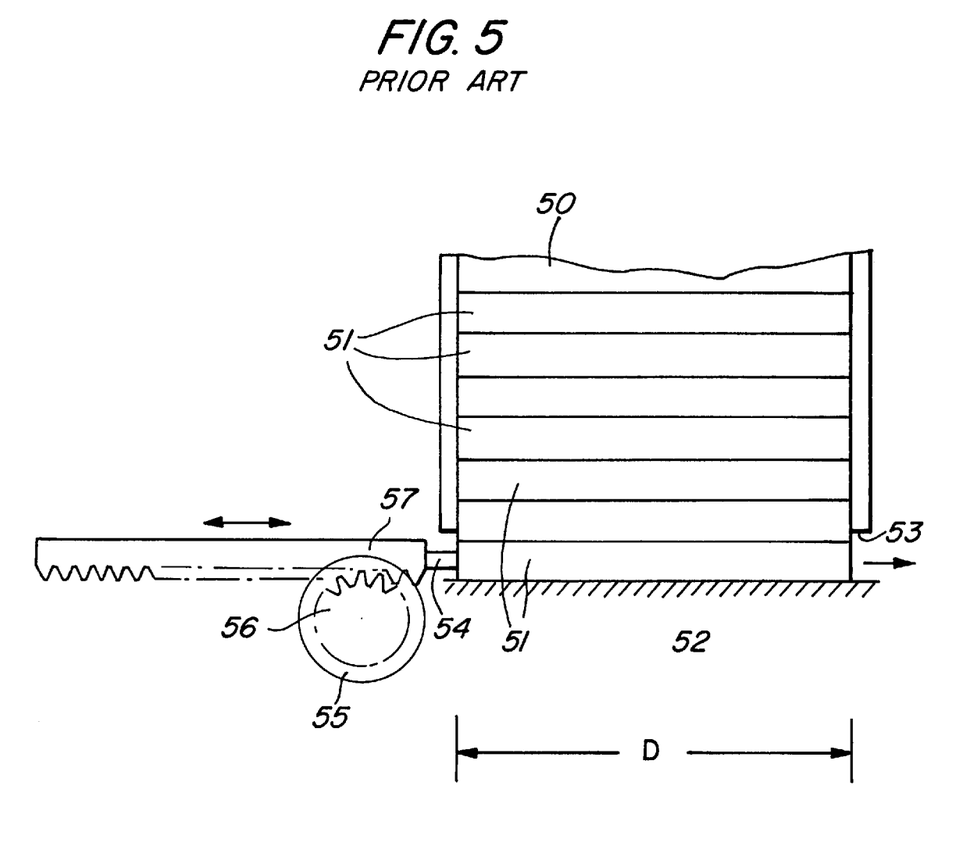
FIG. 5 is a schematic view of a conventional ejector apparatus.

An example of a conventional system for the ejection of tabular objects can be seen in the cross-sectional drawing of FIG. 5. In this system, multiple tabular objects 51 are stacked one on top of the other within an approximately square container 50 to be fed by gravity through an ejection opening 53 by an ejection arm 54. The ejection arm 54 can move back and forth as a result of the interaction of a movable rack 57 with a drive gear 56 that is driven by an electric motor 55. As shown in FIG. 5, the bottom portion of the vertical container 50 is also approximately square and the ejection arm 54 can drive the tabular object product 51 through the ejection opening 53.

Since the tabular object 51 must be driven through the ejection opening 53, it is necessary for the stroke of the ejection arm 54 to be approximately equal to the distance D, indicated in FIG. 5. Accordingly, the length of the movable rack 57 must also be approximately equal to the distance D. As a result, the space necessary for this ejection mechanism must also extend approximately the distance of the length of the movable rack 57, which is contrary to the requirements to provide a compact dispensing apparatus for use in automatic vending machines. Thus, a problem exists in that the size of the entire system for the ejection of tabular object must be able to occupy a space that is approximately twice the distance D and the space is relatively large compared to the size of the tabular objects.

Accordingly, the prior art is still seeking to optimize the design of ejection mechanisms for tabular objects to thereby provide a compact configuration.

OBJECTS AND SUMMARY OF THE INVENTION

An ejection apparatus for dispensing an item from a plurality of stored items includes an ejector member operatively mounted for reciprocal movement to contact an item stored in a stack of items and to eject it and then return to a start position during a return stroke. The ejector member can be pivotally mounted to facilitate the engagement with the lower most item to be ejected and a displacement of the ejector member to accommodate a return stroke movement relative to the remaining stored and stacked items. A flexible, movable member is operatively connected to the ejector member and is relatively rigid when moved in a linear direction of movement during an ejection stroke, but can be flexibly bent to extend in a non-linear direction during a return stroke. A motor or a manual lever can be utilized to drive the movable member along a linear direction in the ejection stroke to contact the stored item and to return the movable member during a return stroke. A reversible electric motor can be utilized to accommodate the reciprocating movement of the movable member between the ejection stroke and the return stroke. A storage tube can be used to accommodate the movable member as it is driven during the return stroke so that it can be appropriately bent to facilitate a compact configuration. The movable member can preferably be made of a flexible resin material with sufficient rigidity to be maintained relatively rigid during the ejection stroke in a linear direction of movement. However, the movable member is flexible enough to bend in conformity with the configuration of the storage tube during the return stroke to thereby facilitate a compact design. The movable member is preferably formed from a flexible resin that can provide appropriate teeth to facilitate engagement with a drive gear. An alternative configuration can include a worm configuration which can interface with a worm wheel.

Thus, the present invention can use a movable member in the form of a movable rack, having a set of teeth, that is flexible enough to bend freely so that it can reduce the necessary linear space required by the stroke movement from the ejection to the return position of the movable member. The ejector member can have a spring-biased lever arm of a pivoting element that can move freely up and down so that it is elevated when an item, such as a tabular object is to be ejected and can be moved downward to provide sufficient clearance during a return stroke relative to the next tabular object, which is dropping down into the previously occupied position. The storage member can take the form of a U-shaped tube configuration. Finally, appropriate mounting flanges and grooves can be used to align and guide both the ejector member and the movable member.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a combination storage system and compact ejection mechanism.

The present invention is attempting to improve an ejector mechanism that is used to eject numerous different stored items, such as floppy disks, compact disks, various types of cards, including magnetic prepaid cards and telephone cards, for example, and various forms of plate-shaped boxes in which items can be placed, such as tobacco, candy, etc. These items can be dispensed through automatic vending machines and are usually stacked for storage within the vending machine. While the present invention is not limited to a specific configuration of a stored item, advantageously for compact storage the items usually take the form of a plate-like member or rectangular configuration that can be generically referred to as a tabular object.

Figure 1:
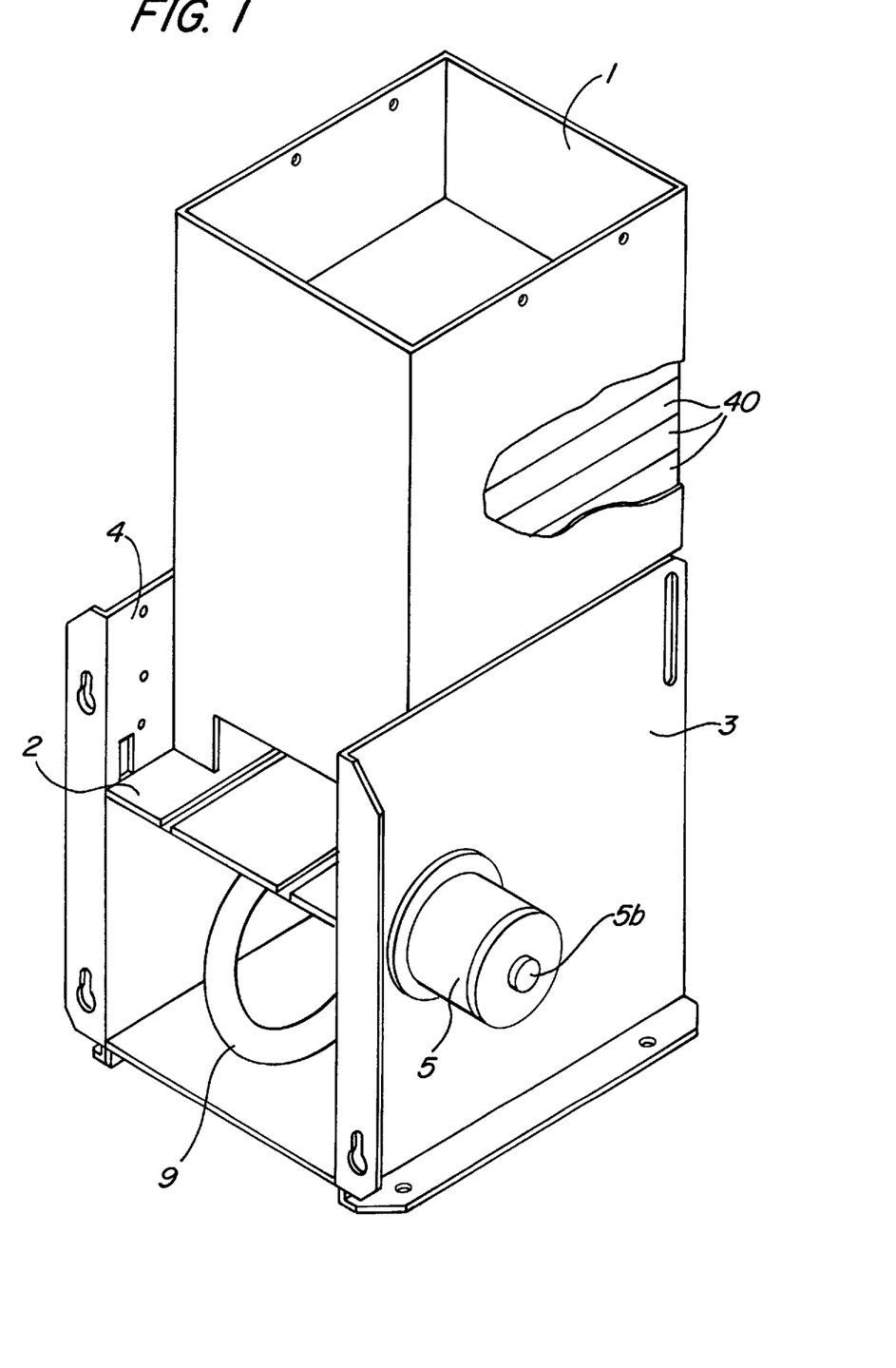
FIG. 1 is a perspective view of an ejection apparatus of the present invention with a storage container.

Referring to FIG. 1, a module of a mechanism that is adapted for an installation within an automatic vending machine is disclosed and includes a storage container 1 that can be opened at the top to enable access for resupplying the objects to be dispensed, such as the tabular objects 40. The container can store multiple tabular objects 40 that can be stacked one upon the other. Container 1 can be attached to or mounted above a square bottom plate 2 having vertical square side plates 3 and 4. The bottom of the container 1 is open so that the tabular objects 40 can be directly supported by a pair of narrow shelf plates 3a and 4a that can be fixed through their respective side plates at a position slightly above the bottom plate 2, as illustrated, for example, in FIGS. 3 and 4. A reversible electric motor 5 can be mounted to append from the side plate 3 through an appropriate aperture. As can be readily appreciated, alternatively, a mechanical arrangement can be used to provide a reciprocating force as an alternative embodiment. The motor 5, however, can transmit a driving force to an ejection arm assembly 10 through a transmitting device or apparatus 6, as shown in FIG. 2.

Figure 2:
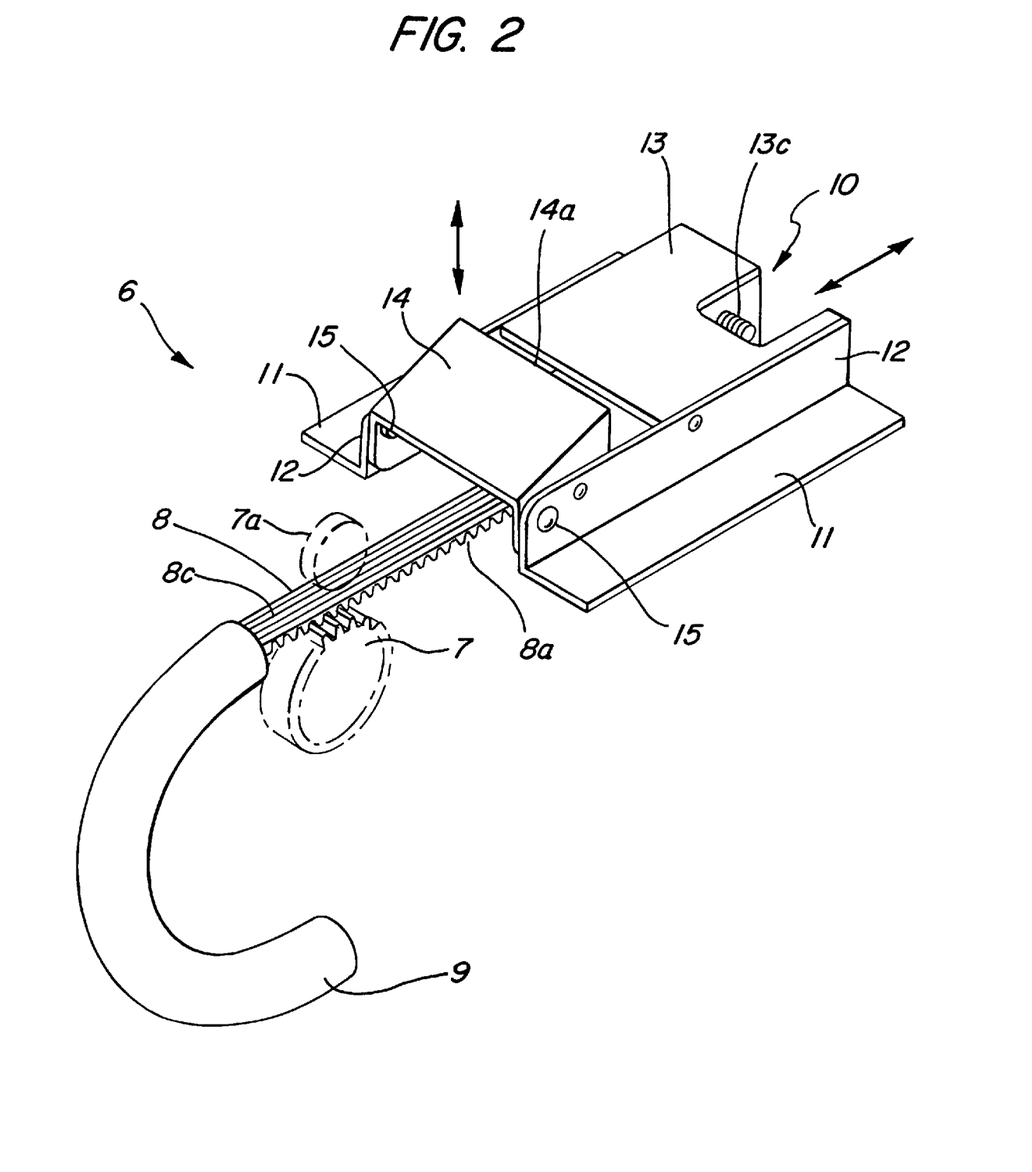
FIG. 2 is a perspective view of the major components of the ejector apparatus of the present invention.

The transmitting device or apparatus 6 includes a gear 7 that can be attached to a power shaft and a transmission assembly, not shown, which is in turn connected to the reversible motor 5. A flexible and longitudinal movable rack member 8 constitutes the movable member that can be connected to the ejection arm assembly 10. This movable rack member 8 can engage with the gear 7 and can be maintained in engagement by a roller 7a that can press slightly down upon the movable rack member 8 so that it is positioned in a nip between the idler roller 7a and the drive gear 7. The movable rack member 8 will also engage with a rack guide path assembly that can control and regulate the moving direction of the movable rack member 8. The movable rack member 8 can extend in a linear direction during an ejection stroke and it is designed to move back and forth along the bottom plate 2 in a reciprocal movement as a result of the clockwise and counterclockwise rotation of the drive gear 7.

The ejection arm assembly has basically a cross-sectional configuration of a U-shape with side flanges 11 that are designed to interface with an appropriate guide track formed between the bottom plate 2 and a pair of upper plates 2a that will be subsequently described.

Figure 4:
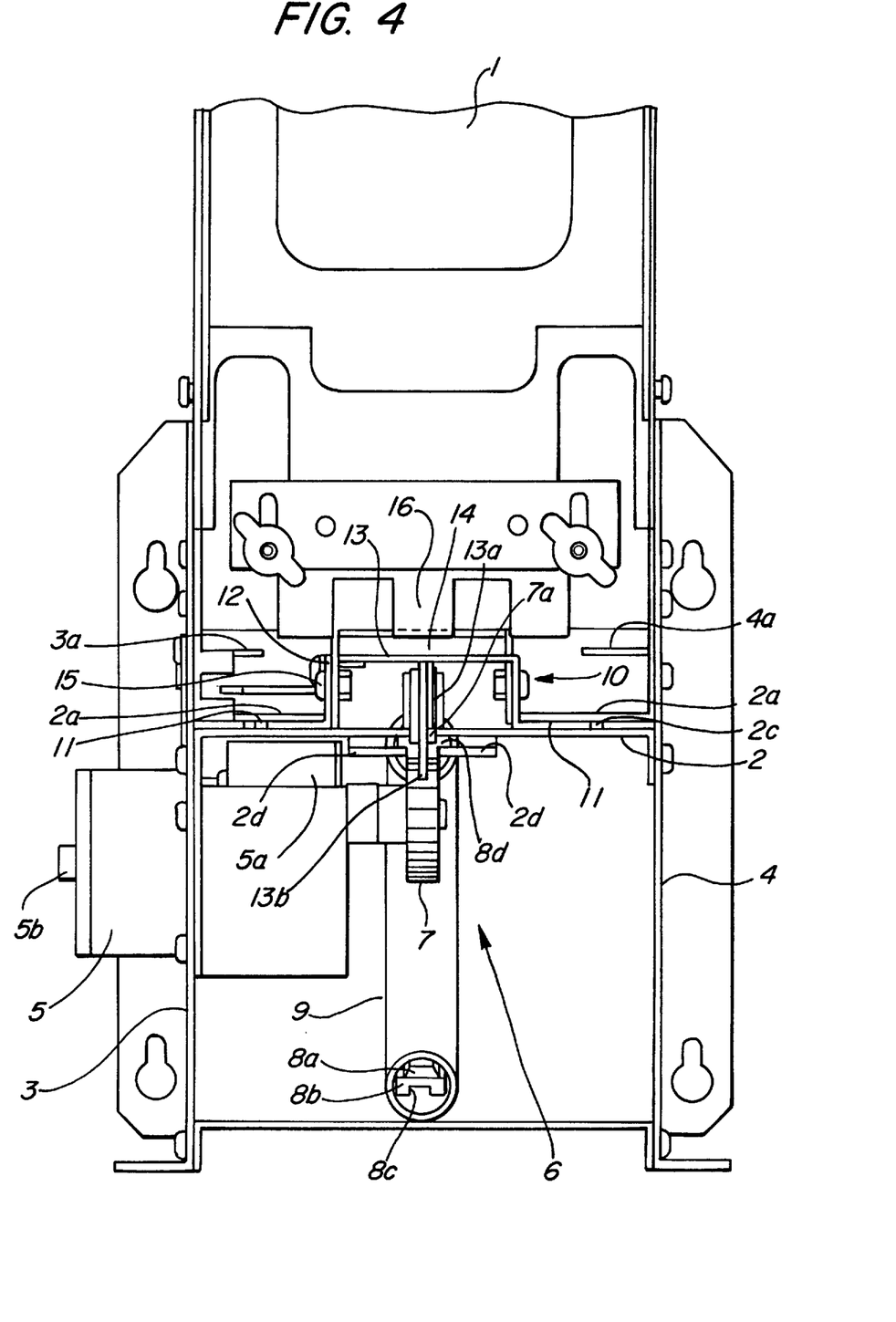
FIG. 4 is an elevated front view of the embodiment of FIG. 1.

The flexible, movable rack 8 also has a partially U-shaped configuration in a cross-sectional view as seen at the lower part of FIG. 4 and illustrated by the front edge part 8d, as well as the leading part 8b, as a result of a groove 8c extending along the length of the movable rack member 8. The dimensions of the groove 8c are to accommodate the idler roller 7a, while a plurality of teeth 8a are formed linearly on the back surface of the movable rack member 8. The movable rack member 8 can be made of a flexible material that can be freely bent, while maintaining a relatively rigid configuration when forced to move in a longitudinal direction along its guide path. An extrusion molded synthetic resin material of sufficient flexibility can be used, such as the DR-molded flexi-rack, manufactured by the Kohara Gear Industry KK Company of Japan. This is an extrusion-molded synthetic resin product.

The dimension of the flexible movable rack member 8 is formed of a necessary length to accommodate the length or size of the tabular objects 40 that are to be ejected from the vending machine.

Figure 3:
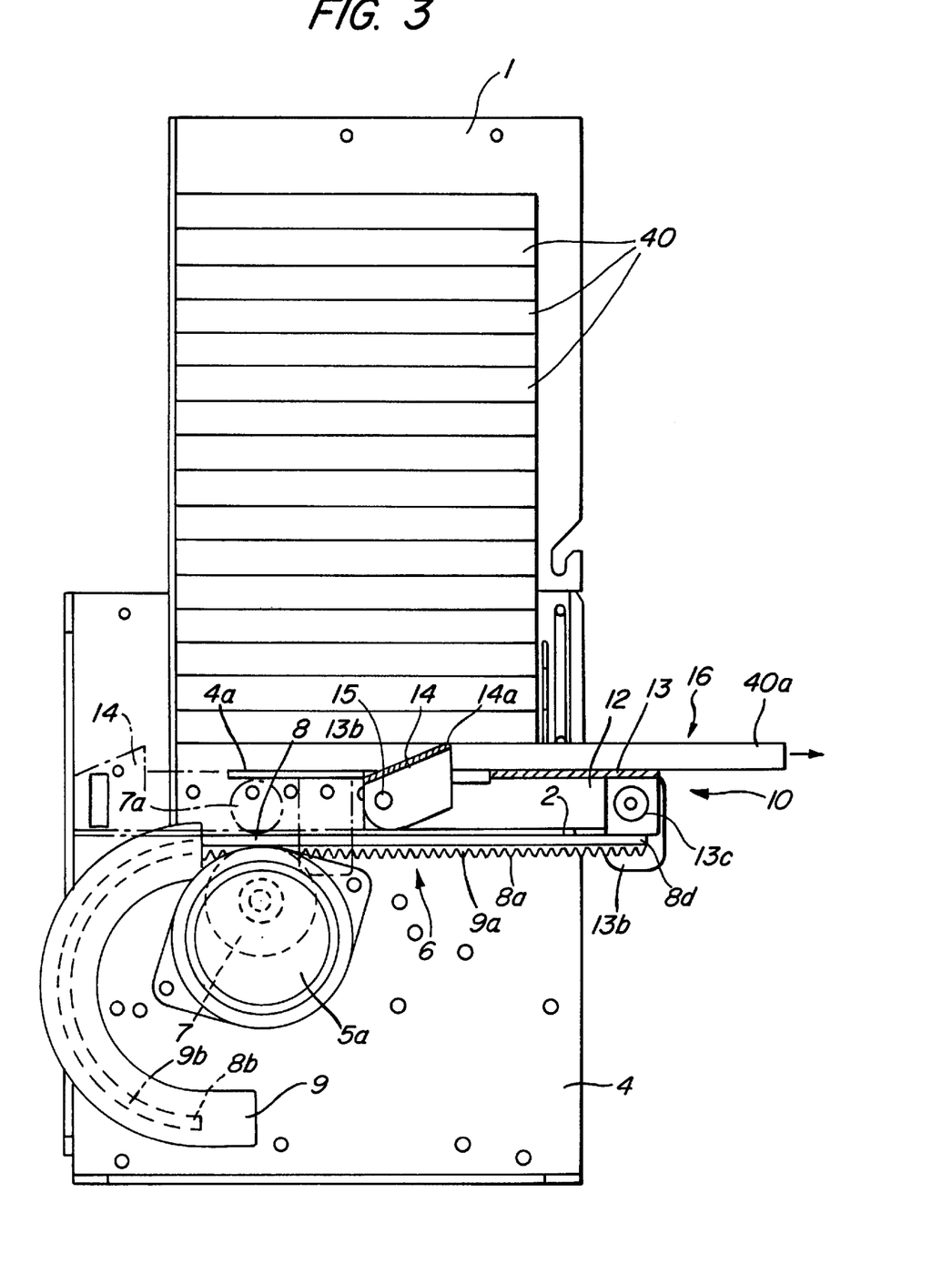
FIG. 3 is a side partial cross-sectional view of the embodiment of FIG. 1.

Referring to FIG. 3, the front edge 8d is fixed to ejection arm assembly 10 along a lower front edge surface by a securing or fixing member 13b that is securely attached through a bent piece 13a with a bolt and nut assembly 13c. Other forms of fixation can be utilized. The front edge of a top plate part 13, which makes up the front part of the ejection arm 10 can be cut and bent downward to form the bent piece 13a, as shown in FIG. 4.

As can be appreciated, the movable rack member 8 should be preferably restrained or guided in its reciprocal stroke and consistent with the purposes of the present invention, the guide path for the movable rack member 8 can consist of a straight portion 9a and bent portion 9b, as shown in FIG. 3.

Referring to FIG. 4, the straight portion 9a of the guide path can include the bottom plate 2, which can slidably support the ejection arm assembly 10 on its top, while at the bottom it can limit any upper displacement of the flexible movable rack member 8. A pair of rails 2d, as seen in FIG. 4, can support the bottom of the flexible movable rack member 8, to create with the plate 2 a pair of longitudinal slits to capture the side flanges of the movable rack member 8. A tubular member 9 having a U-shaped configuration provides a guide path for the bent portion 9b. The tubular guide portion or pipe 9 can be open at both ends, and when the movable rack member 8 moves through the straight portion 9a of the guide path, it is guided with both of its side flanges held by the bottom plate 2 and the rails 2d. When it further moves through the bent part 9b, it is guided so that its path is controlled by the inner wall of the pipe 9. As can be appreciated, different configurations of the pipe 9 can be utilized as long as they accommodate the flexibility of the movable rack member 8. As an alternative embodiment, the pipe 9 can be further sealed in order to prevent dust and debris from accommodating and it is also possible for grease to be applied within the pipe 9 to reduce any friction which may occur with the movement of the movable flexible rack 8. Additionally, the pipe 9 can be formed from metal or an appropriate low-friction plastic material. The design goal of bending the pipe 9 is to ensure that the return stroke of the movable rack member 8 will occupy the smallest area and thereby accommodate a compact small depth design. In this regard, the bent portion 9b of the tube could be modified to provide an S-shaped, J-shaped, or even a spiral shape. While the preferred embodiment shows the bent tube 9 positioned below the bottom plate 2, it could also be positioned at other positions, such as on the side, or even above the bottom plate 2.

Referring to FIG. 2, the ejection arm assembly 10 includes a pair of flanges or sliding plate parts 11 on the right and left sides, a pair of wall plate parts 12 that, respectively, rise up vertically from each of the siding plate parts 11, and a top plate part 13 that extends and is connected between both the wall plate parts 12. If necessary, these members can be integrally formed from a pressed piece of sheet metal or even molded from plastic resin.

A pivoting contact arm member 14 in the shape of an inverted "U" is mounted on each of the respective vertical walls 12 by a pair of hinges 15. The pivoting element 14 is designed to pivot upward with the hinges 15 acting as the pivot shafts. A spring can be used to bias the pivoting contact arm member 14 so that it can extend upward above the respective shelf plates 3a and 4a. Preferably, the pivoting element 14 pivots in a counterclockwise direction, as shown in FIG. 3 and it raises an amount that is approximately equal to the thickness of one tabular object 14. In this position, it is higher than the top plate part 13.

As a design feature, the uppermost position of the pivoting element 14 which is the height of the upper edge 14a, can be preferably adjusted with a screw (not shown) which can be installed at a stopper piece (not shown). It extends from the bottom of the pivoting element 14.

As illustrated in FIG. 4, the side plate parts 11 or flanges are inserted into a pair of gaps 2c that are formed by both sides of the bottom plate 2, and a pair of upper plates 2a to thereby accommodate and define the reciprocal movement between an ejection stroke and a return stroke for the ejection arm assembly 10. The electric motor 5 when rotating in a clockwise direction will drive the movable rack member 8 in a left to right direction via the drive gear 7. The ejection arm assembly 10 will also move towards the right and the pivoting contact arm element 14 will then make contact with the tabular object 40a at the bottom of the container 1 and eject it through the ejection opening 16 at the end of the ejection stroke.

When the electric motor 5 rotates in reverse, i.e., when it rotates counterclockwise after the tabular object 40a is ejected, the ejection arm assembly 10 moves to the left to return to its original start position, as shown in the dashed lines in FIG. 3. During this return stroke, the pivoting contact arm element 14, which has an inclined surface, can pivot clockwise, as shown in FIG. 3, against the force of the spring (not shown) due to the weight of the tabular objects 40 held in the container 1. Thus, the pivoting element 14 can be pushed down between both of the wall plate parts 12, that is, even below the top plate 13 and can return to its original position indicated by the dashed lines in FIG. 3. Thus, the pivoting contact arm element 14 can slide and make contact with the lower surface of the next tabular object 40, which can be dispensed, and the contact arm element 14 can rotate downward during the return stroke and will not move this tabular object 40. As can be seen, this configuration permits the pivoting contact arm element 14 to act as a hook to capture one end of a tabular object 40 and force it outward for dispensing through the ejection opening 16 during an ejection stroke and then the pivoting contact arm element 14 can be retracted during the return stroke to slide across the lower surface of the next tabular object 40 in the stack. The next tabular object 40 can drop down to an ejection position.

As can be appreciated, it would also be possible to use the ejection arm assembly 54, shown in FIG. 5, by itself with the flexible movable rack member 8 of the present invention as an alternative embodiment without using the improvement of the pivoting contact arm element 14. During the return stroke, the rear edge part 8b of the movable rack member 8 will be guided by the pipe 9 to extend below the bottom plate 2. This procedure can be continually repeated until all the stacked tabular objects 40 are ejected.

As mentioned above, it would be possible to replace the electric motor 5 with a manually operating lever that can be installed instead on the side plate 3 so that it can rotate one end of the manually operating lever (not shown) in the form of a long portion of an "L" and fitted into a drive shaft (not shown) of the reduction gear device from the outside of the side plate 3. The drive shaft of the reduction gear device 5a can be rotated through movement of the other end of the manually operating lever. Thus, an operator can control the movement in both the forward and reverse direction instead of utilizing the electric motor 5 in order to eject a tabular object.

As can be appreciated, various forms of rack guide paths can be used as long as they permit a flexible material movable rack member to be guided and to remain relatively rigid in an ejection stroke, while permitting the movable rack member to bend as it reciprocates back in the return stroke. Alternative guide paths in the form of a pipe and an interacting plate that makes contact with the other end of the guide path to change the moving direction of the movable rack member can be used in alternative embodiments. It is also possible that a nonlinear rack guide path can be formed to further reduce the area occupied by the entire rack guide path.

The material that can be used to form the movable rack guide member is not limited to the preferred embodiment. Basically, any material that provides an ability to bend freely while maintaining sufficient rigidity during an ejection stroke can be appropriately considered and used in the present invention. The actual form of the rack member can vary in both thickness and width and also can be twisted. A design purpose is to provide a flexible movable rack member that is both low in cost and lightweight.

Figure 6:
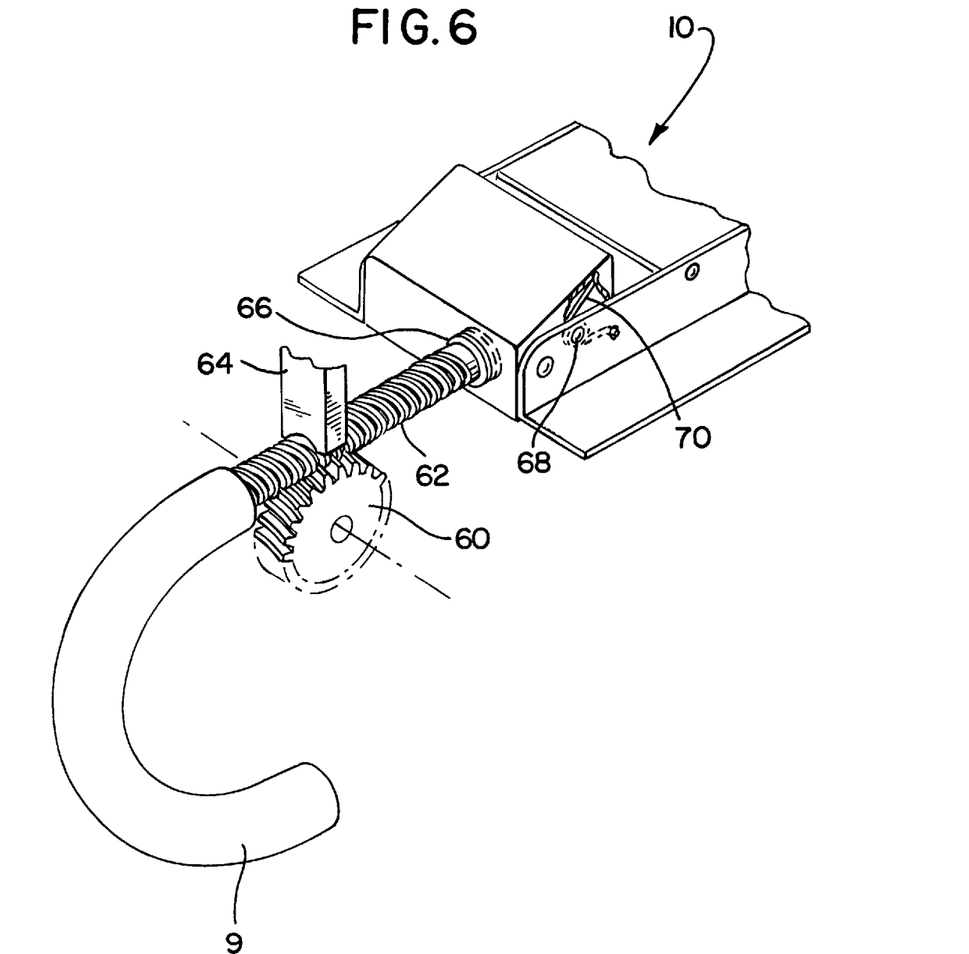
FIG. 6 is a perspective view of an alternative embodiment of the present invention.

As a result of the design choices and features of the present invention, the ejection apparatus of the present invention can be compactly designed and it is even possible to lower the depth of the entire system so that it is almost equal to that of the bottom part of the container. That is, the area adjacent to the area occupied by the bottom of the container in the example of the prior art can be reduced or eliminated to therefore providing a reduced overall space requirement. While the walls of the pipe member disclosed is solid, it can be appreciated that holes, apertures, or even a mesh-like configuration can be utilized. As mentioned above, a manually operating system can be utilized to thereby accommodate locations of dispensers that are remote from a power source Referring to FIG. 6, an alternative embodiment is disclosed wherein a relatively flexible movable worm member 62 can be used in combination with a worm wheel 60. A guide member 64 can restrain the worm member 62 to ensure engagement with the worm wheel 60. The worm member 62 can be formed from a flexible resilient material and can have a pair of flanges 66 for capturing a plate member on the ejection arm assembly. Also, as shown in FIG. 6, a cut away section of the pivoting contact element to discloses a leaf spring 70 that is mounted about its shaft 68 to bias the pivoting contact element 14a to an upward position. The movable worm gear can be driven by an electric motor or a manually operating system mentioned above.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A system for the ejection of tabular objects comprising:
    a container for holding a stack of tabular objects that are to be dispensed;

an ejection device operatively mounted beneath the container which removes the lowest tabular object in the stack of tabular objects;

a flexible elongated rack member to which said ejection device is securely attached;

a drive device for driving this flexible rack member back and forth beneath the container; and a tubular bending device which guides a leading part of the rack member and bends it by approximately 180° to enable a compact configuration beneath the stack of tabular objects.

2. The ejection system described in claim 1 wherein the drive device is equipped with a gear which engages with the rack member.

3. The ejection system described in claim 1 wherein the ejection device is equipped with a spring biased pivoting element that can move freely up and down, wherein said pivoting element rises when the aforementioned tabular object is to be ejected and drops when another tabular object drops into the previously-occupied position.

4. The ejection system described in claim 1 wherein the tubular bending device is a U-shaped pipe.

5. An ejection apparatus for dispensing an item from a plurality of stored items, comprising:

an ejector member operatively mounted for contacting and moving an item from the stored items during an ejection stroke and returning to a start position during a return stroke;

a movable member connected to the ejector member, the movable member having a partial U-shaped configuration with a plurality of teeth centrally located relative to a groove on an opposite side of the movable member, the movable member is elongated and relatively rigid when moved in a linear direction of movement and is flexible when bent to extend in a nonlinear direction;

guide means for contacting the movable member during the ejection stroke to maintain its rigidity;

means for driving the movable member along a linear direction to contact a stored item during the ejection stroke and to return the movable member during the return stroke, includes a motor with a drive gear for engaging the plurality of teeth and idler roller for engagement with the groove; and means for bending a portion of the movable member as it is driven during the return stroke.

6. The ejection apparatus of claim 5 wherein the movable member is formed from a plastic resin material.

7. The ejection apparatus of claim 6 wherein the means for bending includes a U-shaped tube for receiving the movable member.

8. The ejection apparatus of claim 6 wherein the ejector member includes a spring biased pivoting member for contacting a stored item.

9. In a vending machine, the improvement of an ejection apparatus for dispensing an item from a plurality of stored items, comprising:

a container for vertically storing a stack of stored items that are to be dispensed one at a time;

an ejector member operatively mounted beneath the container for contacting and moving an item from the stored items during an ejection stroke and returning to a start position during a return stroke, including a contact arm that extends upward during the ejection stroke and is retracted during the return stroke;

a movable resin member connected to the ejector member, the movable member being elongated and relatively rigid when moved in a linear direction of movement and being flexible when bent to extend in a nonlinear direction;

means for driving the movable member along a linear direction to enable the contact arm to contact a stored item during the ejection stroke and to return the movable member during the return stroke; and means for bending a portion of the movable member 180° relative to the linear direction as it is driven during the return stroke to provide compact storage of the movable member includes a U-shaped pipe.

10. The invention described in claim 9 wherein the U-shaped pipe encompasses the movable member for storage.

11. In a vending machine, the improvement of an ejection apparatus for dispensing an item from a plurality of stored items, comprising;

a container for holding the stored items in a stacked position with a lower opening;

a pair of shelf plates spaced on either side of the lower opening to support the stored item to be dispensed;

an ejector member operatively mounted for contacting and moving an item from the stored items in the container between the shelf plates during an ejection stroke that extends below and across the lower opening of the container and returning to a start position during a return stroke, including a contact arm that extends upward during the ejection stroke to engage the lowermost stacked item between the shelf plates and is retracted during the return stroke as it contacts the subsequent item that is then supported by the shelf plates;

a movable member connected to the ejector member, the movable member being elongated and relatively rigid when moved in a linear direction of movement and being flexible when bent to extend in a nonlinear direction;

means for driving the movable member along a linear direction to enable the contact arm to contact a stored item during the ejection stroke and to return the movable member during the return stroke; and means for bending a portion of the movable member as it is driven during the return stroke to provide compact storage of the movable member includes a U-shaped pipe.

* * * * *